(12) United States Patent
McKinney et al.

(10) Patent No.: US 11,916,221 B2
(45) Date of Patent: Feb. 27, 2024

(54) COMPOSITE ANODE MATERIAL INCLUDING SURFACE-STABILIZED ACTIVE MATERIAL PARTICLES AND METHODS OF MAKING SAME

(71) Applicant: NANOGRAF CORPORATION, Chicago, IL (US)

(72) Inventors: James McKinney, Chicago, IL (US); Cary M. Hayner, Chicago, IL (US); Joshua J. Lau, Chicago, IL (US); Seonbaek Ha, Chicago, IL (US); Francis Wang, Chicago, IL (US)

(73) Assignee: NANOGRAF CORPORATION, Chicago, IL (US)

( * ) Notice: Subject to any disclaimer, the term of this patent is extended or adjusted under 35 U.S.C. 154(b) by 647 days.

(21) Appl. No.: 17/029,729

(22) Filed: Sep. 23, 2020

(65) Prior Publication Data

US 2021/0057720 A1 Feb. 25, 2021

Related U.S. Application Data

(63) Continuation of application No. 15/667,882, filed on Aug. 3, 2017, now Pat. No. 10,804,530.

(51) Int. Cl.
*H01M 4/133* (2010.01)
*H01M 4/38* (2006.01)
(Continued)

(52) U.S. Cl.
CPC .......... *H01M 4/133* (2013.01); *C01B 33/113* (2013.01); *H01M 4/134* (2013.01); *H01M 4/366* (2013.01);
(Continued)

(58) Field of Classification Search
CPC ...... H01M 4/133; H01M 4/134; H01M 4/366; H01M 4/386; H01M 4/483; H01M 4/485;
(Continued)

(56) References Cited

U.S. PATENT DOCUMENTS 8,377,591 B2 2/2013 Miyachi et al.
8,551,650 B2 10/2013 Kung et al.
(Continued)

FOREIGN PATENT DOCUMENTS

CN 104040763 A 9/2014
CN 106816594 A 6/2017
(Continued)

OTHER PUBLICATIONS

European Patent Office, Communication Pursuant to Article 94(3) EPC for European Patent Application No. 18840331.5, dated Mar. 7, 2023, 4 pages.
(Continued)

*Primary Examiner* — Gary D Harris
(74) *Attorney, Agent, or Firm* — THE MARBURY LAW GROUP PLLC (57) ABSTRACT

Composite anode materials and methods of making same, the anode materials including capsules including graphene, reduced graphene oxide, graphene oxide, or a combination thereof, and particles of an active material disposed inside of the capsules. The particles may each include a core and a buffer layer surrounding the core. The core may include crystalline silicon, and the buffer layer may include a silicon oxide, a lithium silicate, carbon, or a combination thereof.

17 Claims, 5 Drawing Sheets

(51) Int. Cl.
*H01M 10/0525* (2010.01)
*H01M 4/62* (2006.01)
*H01M 4/485* (2010.01)
*C01B 33/113* (2006.01)
*H01M 4/48* (2010.01)
*H01M 4/36* (2006.01)
*H01M 4/587* (2010.01)
*H01M 4/134* (2010.01)
*C01B 32/198* (2017.01)

(52) U.S. Cl.
CPC .......... *H01M 4/386* (2013.01); *H01M 4/483* (2013.01); *H01M 4/485* (2013.01); *H01M 4/587* (2013.01); *H01M 4/622* (2013.01); *H01M 10/0525* (2013.01); *C01B 32/198* (2017.08)

(58) Field of Classification Search
CPC .. H01M 4/587; H01M 4/622; H01M 10/0525; H01M 4/1395; H01M 4/62; H01M 4/625; C01B 33/113; C01B 32/198; C01B 32/182; C01B 33/02; C01B 33/32; Y02E 60/10; Y02P 20/133
USPC ...................................................... 429/231.8
See application file for complete search history.

(56) References Cited

U.S. PATENT DOCUMENTS

| | | | |
|---|---|---|---|
| 2006/0147797 | A1 | 7/2006 | Wu et al. |
| 2007/0224508 | A1 | 9/2007 | Aramata et al. |
| 2010/0075227 | A1 | 3/2010 | Morita et al. |
| 2012/0171560 | A1 | 7/2012 | Xu et al. |
| 2012/0288750 | A1 | 11/2012 | Kung et al. |
| 2013/0004798 | A1 | 1/2013 | Huang et al. |
| 2013/0164612 | A1 | 6/2013 | Tanemura et al. |
| 2013/0230769 | A1 | 9/2013 | Xu |
| 2013/0344392 | A1 | 12/2013 | Huang et al. |
| 2014/0170485 | A1 | 7/2014 | Lee et al. |
| 2014/0234722 | A1 | 8/2014 | Kyotani et al. |
| 2016/0372784 | A1 | 12/2016 | Hayner et al. |
| 2017/0040599 | A1 | 2/2017 | Kamo et al. |
| 2017/0352883 | A1* | 12/2017 | Cho .................... H01M 4/386 |
| 2019/0044128 | A1 | 2/2019 | McKinney et al. |
| 2019/0190023 | A1 | 6/2019 | Kashitani |
| 2020/0058924 | A1 | 2/2020 | Pang et al. |

FOREIGN PATENT DOCUMENTS

| | | |
|---|---|---|
| EP | 2851979 A1 | 3/2015 |
| JP | 2007294423 A | 11/2007 |
| JP | 2014073942 A | 4/2014 |
| KR | 10-2016-0142788 A | 12/2016 |
| WO | WO2015107581 A1 | 7/2015 |
| WO | WO2017083804 A1 | 5/2017 |
| WO | WO2018074175 A1 | 4/2018 |
| WO | WO2017038320 A1 | 6/2018 |
| WO | WO2019189747 A1 | 10/2019 |

OTHER PUBLICATIONS

China National Intellectual Property Administration Office Communication, First Office Action with Search Report for PRC (China) Patent Application No. 201880059396.3, dated Sep. 21, 2022, 7 pages.

Lee et al., "Silicon Nanoparticles-Graphene Paper Composites for Li Ion Battery Anodes," Chem. Commun., vol. 46, (2010) pp. 2025-2027.

Lee et al., "High-Performance Silicon-based Multicomponent Battery Anodes Produced via Synergistic Coupling of Multifunctional Coating Layers," Energy Environ. Sci., 2015, 8, 2075.

Sim et al.,"Critical Thickness of $SiO_2$ Coating Layer on Core@Shell Bulk@Nanowire Si Anode Materials for Li-Ion Batteries," Adv. Mater. 2013, 25, 4498-4503.

Nguyen et al., "Roles of Oxygen and Interfacial Stabilization of in Enhancing the Cycling Ability of Silicon Oxide Anodes for Rechargeable Lithium Batteries," Journal of the Electrochemical Society, 160 (6) A906-A914 (2013).

International National Preliminary Report on Patentability and Written Opinion of the International Searching Authority for International Patent Application No. PCTU/US2017/039416, dated Jan. 24, 2019, 11 pgs.

Kim, H. et al., "Recent Advances in the Si-Based Nanocomposite Materials as High Capacity Anode Materials for Lithium ion Batteries", Materials Today, 2014, vol. 17, No. 6, pp. 285-297, (2014).

Luo, W. et al., "Surface and Interface Engineering of Silicon-Based Anode Materials for Lithium-ion Batteries", Advanced Energy Materials, 2017 (Abstract Only), vol. 7, No. 24, pp. 1-28, Article No. 1701083, (2017).

Notification Concerning Transmittal of Copy of International Preliminary Report on Patentability and Written Opinion of the International Searching Authority for International Patent Application No. PCTU/US2017/039416, dated Feb. 13, 2020, 9 pgs.

European Official Communication and extended European Search Report including the European Search Opinion for European Patent Application No. 18840331.5, dated May 4, 2021, 29 pages.

Japan Patent Office, First Office Action for Japanese Patent Application No. 2020-529091, dated Jan. 31, 2023, 2 pages.

* cited by examiner

First Process

FIG. 3A

Second Process

COMPOSITE ANODE MATERIAL INCLUDING SURFACE-STABILIZED ACTIVE MATERIAL PARTICLES AND METHODS OF MAKING SAME

TECHNICAL FIELD

This invention relates to the art of electrochemical cells, and more particularly, to composite anode materials including surface-stabilized active material particles encapsulated in graphene or reduced graphene oxide, and methods of making the same.

BACKGROUND

Lithium (Li) ion electrochemical cells typically have a relatively high energy density and are commonly used in a variety of applications which include consumer electronics, wearable computing devices, military mobile equipment, satellite communication, spacecraft devices and electric vehicles. Lithium ion cells are particularly popular for use in large-scale energy applications such as low-emission electric vehicles, renewable power plants, and stationary electric grids. Additionally, lithium-ion cells are at the forefront of new generation wireless and portable communication applications. One or more lithium ion cells may be used to configure a battery that serves as the power source for these applications. The explosion in the number of higher energy demanding applications and the limitations of existing lithium-ion technology are accelerating research for higher energy density, higher power density, higher-rate charge-discharge capability, and longer cycle life lithium ion cells.

Lithium ion cells are mainly composed of an anode, for example, graphite, a carbonate-based organic electrolyte, and a cathode comprising a cathode active material, for example, lithium cobalt oxide ($LiCoO_2$). Lithium ions are intercalated and deintercalated between the anode and the cathode through the electrolyte during discharge and charge. When electrical energy is removed from the cell to supply power, or is discharging, lithium ions move from the negative electrode (anode) to the positive electrode (cathode). When the cell is supplied electrical energy for conversion to stored chemical energy or is charging, the opposite occurs. Lithium ions generally move from the positive electrode (the cathode) to the negative electrode (the anode) during charging. For example, the theoretical capacities of a graphite anode and a $LiCoO_2$ cathode are 372 mAh/g and less than 160 mAh/g, respectively. These theoretical charge capacities, however, are often too low for the recent surge in higher energy demanding applications.

Incorporating silicon within a carbon based anode significantly increases the capacity of the anode material. Silicon has a theoretical capacity of about 4,200 mAh/g, which significantly increases cell capacity when incorporated within an electrode comprising graphite, graphene, or other carbon based active material. Examples of electrodes comprising graphene and silicon are provided in U.S. Pat. No. 8,551,650 to Kung et al. and U.S. patent application publication number 2013/0344392 to Huang et al., both of which are incorporated fully herein by reference.

Furthermore, it is generally understood that silicon incorporated within these electrodes typically undergoes a significant volume expansion of up to 400 percent upon the insertion and extraction of lithium during the cycling process. As a result of this significant volume increase, the silicon within the electrode structure experiences a significant mechanical stress which typically causes the material to fracture and impart defects within its structure. Such structural degradation of the silicon within the active material typically leads to a reduction in intercalation and de-intercalation of the lithium ions within the active material which causes a reduction in capacity and/or cycle life. In addition, the mechanical degradation of the silicon typically results in the electrical disconnection of the silicon within the active material. This electrical disconnection of the silicon caused by mechanical degradation of the silicon particles generally leads to a further reduction of cycle life and increased capacity loss.

Accordingly, there is a need for a lithium cell with increased capacity and cycle life. The present application, therefore, addresses this problem by disclosing an electrochemically active material for use in a lithium ion that increases cycle life.

SUMMARY

Various embodiments provide a composite anode material comprising capsules comprising graphene, reduced graphene oxide, graphene oxide, or a combination thereof, and active material particles disposed inside of the capsules. Each particle may include a core and a buffer layer surrounding the core, with the buffer layer and the core comprising different materials.

Various embodiments provide an anode comprising: capsules comprising graphene, reduced graphene oxide, graphene oxide, or a combination thereof; active material particles disposed inside of the capsules; and a binder. Each particle may include a core and a buffer layer surrounding the core, with the buffer layer and the core comprising different materials.

Various embodiments provide a method of forming an anode active material, the method comprising: heating crystalline silicon particles in an inert atmosphere at a first temperature ranging from about 700° C. to about 900° C.; heating the particles at the first temperature in an oxidizing atmosphere, for a first time period, to form oxidized particles comprising a silicon oxide coating surrounding a crystalline silicon core; and cooling the oxidized particles in an inert atmosphere.

In various embodiments, the method may further include: mixing the oxidized particles, a lithium salt, and a solvent to form a mixture; drying the mixture; and heating the dried mixture at a temperature ranging from about 600° C. to about 700° C. in an inert atmosphere for a second time period, to form active material particles that each comprise a buffer layer comprising a lithium silicate surrounding a crystalline silicon core.

DETAILED DESCRIPTION

In general, the present invention relates to the structure and method of formation thereof of an electrochemically active material comprising silicon and graphene. The active material may be formed into an electrode that is incorporatable within an electrochemical cell. More specifically, the present invention relates to the structure and method of formation thereof of an electrochemically active material comprising silicon and graphene that may be formed into an electrode for use with a lithium ion electrochemical cell that is designed to provide increased capacity and capacity retention.

In various embodiments, the electrochemically active material of the present application comprises at least one electrochemically active component that is encased or encapsulated within a capsule or shell composed of at least one of graphene, partially reduced graphene oxide, or graphene oxide. In various embodiments, the active material particle comprises a core-shell structure. In various embodiments, the core-shell structure of the active material particle comprises a core material that is encased or encapsulated within a buffer layer. The buffer layer comprising a material that is different than the core material.

In various embodiments the buffer layer that surrounds the core material, such as silicon or a silicon-based material, allows for mechanical expansion of the core material so that the active material particles are less likely to fracture or mechanically degrade due to expansion. Thus, the capacity of the resulting lithium-ion cell that comprises a composite anode material of the present application is maintained over multiple charge-discharge cycles.

The particles of the electrochemically active material of the present application may comprise a multitude of structures, including but not limited to, a crumpled, paper ball-like structure, a core-shell structure, or a substantially spherical-like shape. In addition, the particle structure of the electrochemically active material of the present application provides a compact structure that increases electrical conductivity and decreases the distance in which lithium ions diffuse. Furthermore, the particle structure of the electrochemically active material provides for an internal void space 20 within the structure of each of the particles that tolerates swelling of the core material, such as silicon or a silicon-based material, and minimizes known negative effects that compromise achievable capacity, thus preserving capacity as the cell is charged and discharged. In various embodiments, graphene, partially reduced graphene oxide, graphene oxide, or a combination thereof, forms a capsule having at least one internal void space 20 therein devoid of graphene, which encases or encapsulates at least one active material particle therein. The present application further discloses a method of fabricating the novel electrochemically active material, and a method of forming the electrochemically active material of the present application into an electrode for incorporation within an electrochemical cell. In various embodiments, the electrode of the present application is an anode or negative electrode that may be incorporated within a secondary lithium-ion electrochemical cell.

As defined herein a "secondary" electrochemical cell is an electrochemical cell or battery that is rechargeable. "Capacity" is defined herein as the maximum amount of energy, in ampere-hours (Ah), that can be extracted from a battery under certain specified conditions; the amount of electric charge that can be delivered at a rated voltage. Capacity may also be defined by the equation: capacity=energy/voltage or current (A)×time (h). "Energy" is mathematically defined by the equation: energy=capacity (Ah)×voltage (V). "Specific capacity" is defined herein as the amount of electric charge that can be delivered for a specified amount of time per unit of mass or unit of volume of electrode active material. Specific capacity may be measured in gravimetric units, for example, (A·h)/g or volumetric units, for example, (A·h)/cc. Specific capacity is defined by the mathematical equation: specific capacity (Ah/Kg)=capacity (Ah)/mass (Kg). "Rate capability" is the ability of an electrochemical cell to receive or deliver an amount of capacity or energy within a specified time period. Alternately, "rate capability" is the maximum continuous or pulsed output current a battery can provide per unit of time. Thus, an increased rate of charge delivery occurs when a cell discharges an increased amount of current per unit of time in comparison to a similarly built cell, but of a different anode and/or cathode chemistry. "C-rate" is defined herein as a measure of the rate at which a battery is discharged relative to its maximum capacity. For example, a 1 C rate means that the discharge current will discharge the entire battery in 1 hour. "Power" is defined as time rate of energy transfer, measured in Watts (W). Power is the product of the voltage (V) across a battery or cell and the current (A) through the battery or cell. "C-Rate" is mathematically defined as C-Rate (inverse hours)=current (A)/capacity (Ah) or C-Rate (inverse hours)=1/discharge time (h). Power is defined by the mathematical equations: power (W)=energy (Wh)/time (h) or power (W)=current (A)×voltage (V).

A "composite anode material" may be defined as a material that may be configured for use as an anode in an electrochemical cell, such as a lithium ion rechargeable battery and that includes surface stabilized active material particles encapsulated in a capsule of graphene, reduced graphene oxide, or graphene oxide. The anode material may include anode material particles, a binder, and may optionally include a conductivity enhancing agent. An "electrochemically active material" or "active material" is defined herein as a material that inserts and releases ions, such as ions in an electrolyte, to store and release an electrical potential. A "capsule" or "shell" is defined herein as a structure that surrounds and encases an active material particle. An "active material particle" is defined herein as a particle of the active material that may be disposed within the capsule, and includes a core surrounded by one or more buffer layers. In some embodiments, the core material may be an electrochemically active material. A "buffer layer" is a layer of material that surrounds and encases the core of an active material particle. "Void space" is defined herein a space between the active material particles and an interior surface of the capsule or shell structure.

Figure 1:
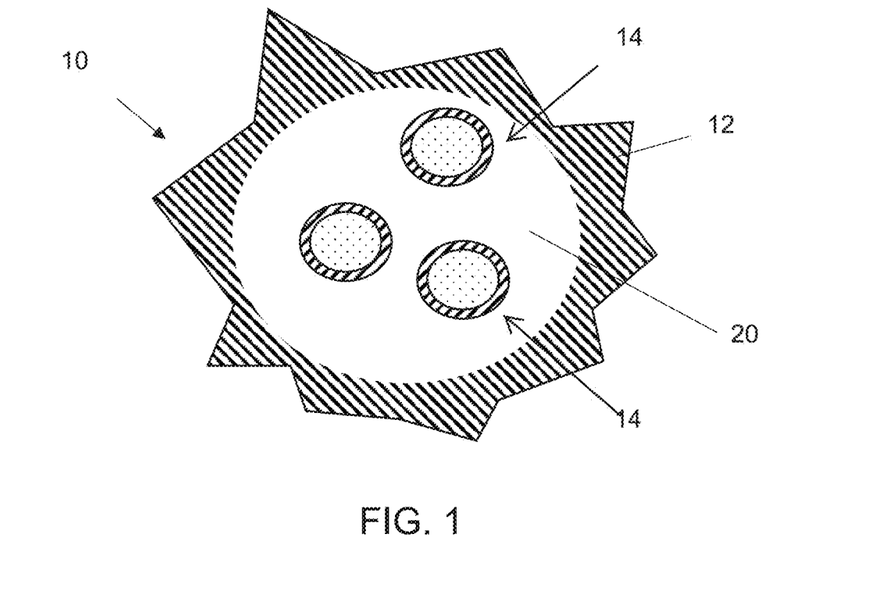
FIG. 1 illustrates a cross-sectional view of an embodiment of a structure of a particle of a composite anode material, according to various embodiments of the present disclosure.

FIG. 1 illustrates a composite anode material particle 10 included in a composite anode material, according to various embodiments of the present disclosure. Referring to FIG. 1, while one particle 10 is shown, the composite anode material may include a plurality of the anode material particles 10, according to various embodiments of the present disclosure. In addition, the anode material may also include a binder and optionally a conductivity enhancing agent. The anode material particle 10 may comprise a shell or capsule 12 that encloses and/or encapsulates at least one active material particle 14 therein.

In various embodiments, the capsule 12 may include graphene, reduced graphene oxide, or graphene oxide. Herein, reduced graphene oxide may be formed by partially, or substantially completely, reducing graphene oxide. The capsule 12 may have a crumpled structure. The capsule 12 may be substantially spherical or ovoid. In some embodiments, the capsule 12 may have a smooth or roughened outer surface morphology. The capsule 12 provides a void space 20 therein that allows for controlled expansion of the active material particles 14 enclosed therein.

Figure 2:
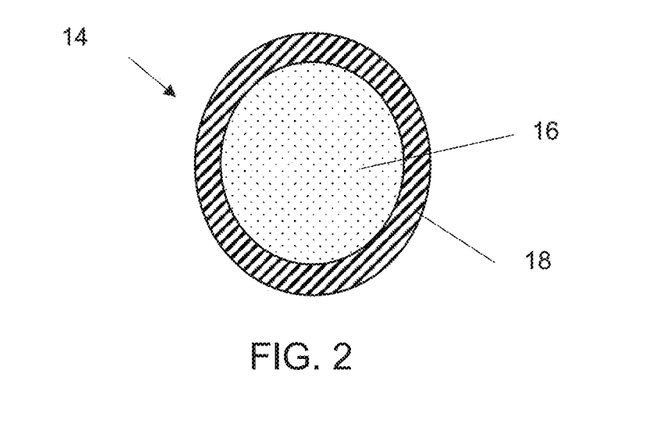
FIG. 2 illustrates a cross-sectional view of an embodiment of a core-shell structure of an active material particle, according to various embodiments of the present disclosure.

FIG. 2 illustrates an embodiment of an active material particle 14. As shown in the embodiment, each active material particle 14 comprises a core 16, and a buffer layer 18 surrounding the core 16. In various embodiments, the core 16 may comprise an electrochemically active material such as metallic silicon (Si). The buffer layer 18 may comprise a silicon oxide, a lithium silicate, carbon-based materials, or a combination thereof. In various embodiments, the buffer layer 18 may comprise one or more silicon oxides ($SiO_x$), wherein 0<x<0.8, one or more lithium silicates, such as $Li_2Si_2O_5$, $Li_2SiO_3$, and $Li_4SiO_4$, or any combination thereof. For example, the buffer layer 18 may comprise a composite matrix of oxides, silicates, and/or carbon phases and/or layers. Such a composite buffer layer may provide for unexpectedly improved cycle life when incorporated into a battery.

The buffer layer 18 provides for a mechanical buffer that surrounds each core 16. More specifically, the buffer layer 18 provides for a mechanical support that minimizes mechanical degradation and spalling of the core 16. Thus the buffer layer 18 helps to minimize fracture of the core 16, due to mechanical expansion. For example, the buffer layer 18 may allow the core 16 to be formed of crystalline silicon, which would otherwise suffer from mechanical degradation.

In various embodiments, the core 16 may have an average particle size that is less than about 500 nm, such as from about 50 nm to about 400 nm. The buffer layer 18 may have a thickness that ranges from about 1 nm to about 50 nm, such as from about 1 nm to about 25 nm, from about 5 nm to about 15 nm, or from about 7 nm to about 12 nm. In various embodiments, the thickness of the buffer layer 18 may be about 10 nm or less.

In various embodiments, the anode material 10 may comprise about 70 weight percent graphene, reduced graphene oxide, or graphene oxide, and about 30 weight percent active material particles 14. In various embodiments, the anode material particles 10 (e.g., the capsules 12) may have an average particle size that ranges from about 0.5 μm to about 10 μm. In various embodiments, the average particle size of the anode material particles 10 may range from about 2 μm to 5 μm.

In various embodiments, the average particle size of the active material particles 14 may range from about 30 nm to about 100 nm. Further embodiments of anode materials and structures thereof are disclosed in U.S. Patent Application Publication Numbers 2013/0004798 and 2013/0344392, both to Huang et al., all of which are incorporated fully herein by reference.

Figure 3A:
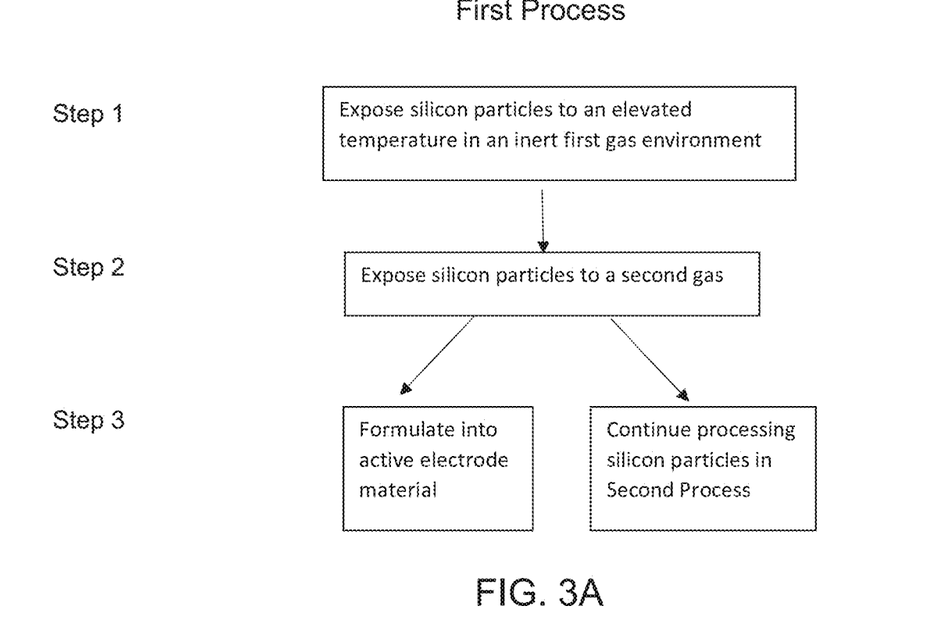
FIG. 3A shows an embodiment of a flow chart of the first active material particle modification process that may be used to modify the structure of the active material particle.
Figure 3B:
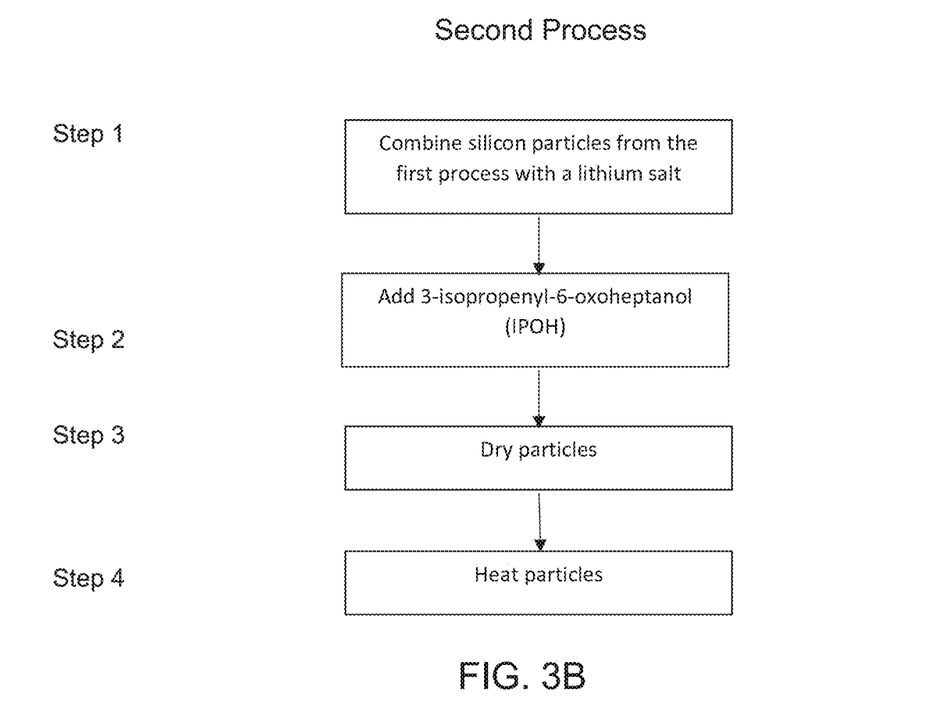
FIG. 3B shows an embodiment of a flow chart of the second active material particle modification process that may be used to modify the structure of the active material particle.

In various embodiments, the active material particles 14 may be fabricated utilizing a two-step active material modification process. FIGS. 3A and 3B illustrate flow charts of the first and second processes that comprise the two-stage active material modification process. In various embodiments, the first process of FIG. 3A comprises heating core material particles, such as crystalline silicon particles, in an enriched oxygen atmosphere, to form an oxide buffer layer, such as a silicon oxide layer, on the surfaces of core material particles.

In various embodiments, silicon particles are first heated in an inert gas environment at a temperature that ranges from about 700° C. to about 1,000° C., such as a temperature ranging from about 700° C. to about 900° C., or from about 750° C. to about 850° C. The inert gas may comprise argon, helium, neon, xenon or combinations thereof. In various embodiments, the silicon particles may have an average particle size that ranges from about 25 nm to about 5 μm, such as from about 50 nm to about 1 μm, or from about 50 nm to about 500 nm.

Once the silicon particles are heated to the desired temperature, the silicon particles are exposed to an oxidizing gas, such as compressed air or an oxygen enriched gas. In various embodiments, the silicon particles are heat treated in the oxidizing gas for a time period ranging from about 15 minutes to about an hour. The oxidizing gas may be compressed to form an enriched oxygen gas comprising about 10 to about 40 percent oxygen, such as from about 15 to about 25 percent oxygen. Alternatively, the oxidizing gas may be pure oxygen. It is noted that larger size silicon particles may require longer dwell times at increased temperatures in the enriched oxygen environment to form a buffer layer on the core particles at a desired thickness and composition.

In various embodiments, silicon particles having a particle size of about 50 nm may comprise a buffer layer 18 having a thickness that ranges from about 4 nm to about 10 nm. For larger size silicon, such as core particles having an average particle size of about 400 nm, the thickness of the buffer layer may be greater. For example, a buffer layer, formed on core particles having an average particle size of about 400 nm, may have a thickness ranging from about 10 nm to about 50 nm.

For example, crystalline silicon core particles having an average particle size of about 50 nm may be exposed to a compressed air environment at a temperature of about 750° C., for about 15 minutes, whereas core particles having a particle size of about 400 nm may be exposed to a compressed air environment at about 800° C., for about 30 minutes. Once the buffer layers have been formed, the resultant buffered (e.g., oxidized) active material particles may be incorporated into an anode material for use as an electrode of a lithium ion cell.

In some embodiments, the buffered active material particles may be further processed in the second process shown in FIG. 3B. The second process further modifies the composition of the buffer layers, such that the buffer layers comprise one or more lithium silicates.

For example, the second process may comprise mixing the buffered active material particles, a lithium salt, and a solvent to form a precursor solution, which may then be mixed for a time period ranging from about 1 to about 2 hours. For example, the mixing may be performed by sonication.

The solvent may include 3-isopropenyl-6-oxoheptanol (IPOH), for example. The lithium salt may include any suitable lithium salt, such as, lithium acetate dehydrate, $LiO_2$, LiS, $LiPF_6$, bis(oxalato)borate (LiBOB), oxalyldifluoroborate (LiODFB) and fluoroalkylphosphate (LiFAP), or the like. When a lithium salt including an organic component, such as lithium acetate dehydrate, is used, the resulting buffer layer may include carbon or a carbon layer.

In some embodiments, the buffer layer includes silicon oxide and the precursor solution includes oxidized active material particles at a silicon oxide to lithium salt weight ratio that ranges from 1:0.5 to 1:0.75, such as from about 1:0.6 to 1:0.7, or about 1:0.67. In various embodiments, the weight ratio of the buffer layer to lithium salt is appropriately selected such that the lithium salt reacts with the buffer layer without reacting with the core particle.

In various embodiments, the precursor solution includes an amount of solvent sufficient to create a solids content that ranges from about 5 to about 15 wt %, with respect to the total weight of the precursor solution. In various embodiments, the IPOH is added to create a solids content of about 10 wt %. After the IPOH is added to the desired solids content, the mixture is mixed for about 1 to about 2 hours. The mixture may be sonicated to ensure a homogenous mixture.

After mixing is complete, the solution is dried to remove the solvent. In various embodiments, the resultant particles are then heat treated in an inert atmosphere, for example, argon, at a temperature of about 650° C., for from about 10 minutes to about 1 hour, to form active material particles having a core comprising silicon and a buffer layer comprising a lithium silicate, such as $Li_2Si_2O_5$, $Li_2SiO_3$, $Li_4SiO_4$, or combinations thereof.

Figure 4:
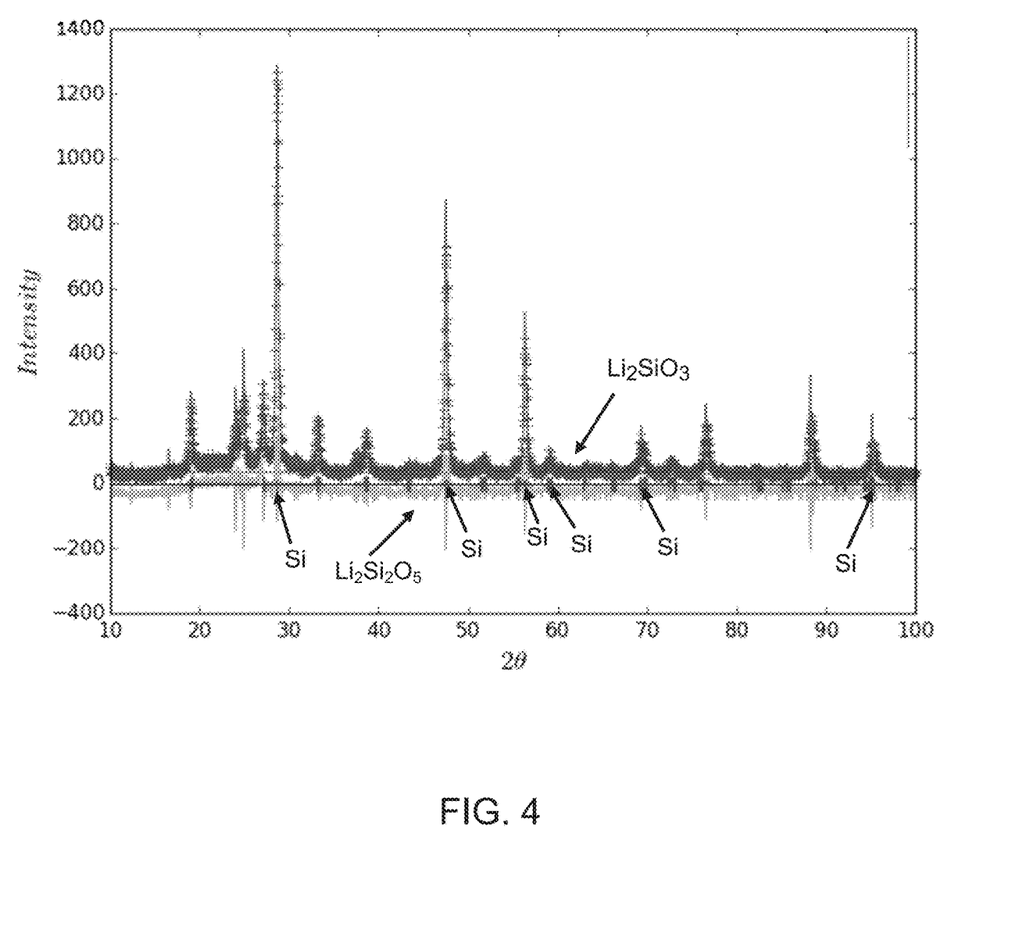
FIG. 4 is an x-ray diffraction pattern of particles of an embodiment of the active material particle of the present application.

FIG. 4 is an x-ray diffraction (XRD) pattern of the active material particles after the step two active material particle modification process. As illustrated in FIG. 4, the XRD pattern shows that the particles comprise a combination of Si, $Li_2SiO_3$ and $Li_2Si_2O_5$. In various embodiments, the composition of the buffer layer may comprise a mixture of $Li_2Si_2O_5$ and $Li_2SiO_3$ having a weight ratio of 15:9 respectively.

In addition to crystalline silicon, it is further contemplated that the core material of the active material particles may comprise other materials that include, but not limited to, silicon oxide, titanium oxide, graphite, carbon, metal nanoparticles (e.g., silver or platinum), salts, such as CsCl, tin (Sn), tin oxide, antimony (Sb), aluminum (Al), germanium (Ge), gallium (Ga), magnesium (Mg), zinc (Zn), lead (Pb), bismuth (Bi), lithium titanium oxide, their alloys, intermetallics, other monometallic, bimetallic, or multi metallic materials, or oxidic or sulfide materials, and mixtures thereof, in a nano-particle form. Some specific examples may include metal oxides, such as ZnO, $Co_3O_4$, $Fe_2O_3$, $MnO_2$, $Mn_3O_4$, MnO, $Fe_3O_4$, NiO, $MoO_2$, $MoO_3$, CuO, $Cu_2O$, $CeO_2$, and $RuO_2$. In various embodiments, particles of the active material particles, such as those formulated by either or both of the first and second processes, are then incorporated within the anode material of the present application.

In various embodiments, the anode material may be formed by encapsulating the active material particles within a capsule of at least one of graphene, reduced graphene oxide, or graphene oxide. In various embodiments, a spray drying process in which heat from the spray drying process crumples the graphene, reduced graphene oxide, or graphene oxide around the active material particles.

In various embodiments, the shape of the particles of the anode material particles may be customized by adjusting the parameters of the spray-drying process. For example, the anode material particles may have a structure that is specifically engineered to be of a substantially crumpled, paper ball-like structure, a core-shell structure, or a substantially spherical-like shape in which multiple sheets of graphene, partially reduced graphene oxide, or graphene oxide come together to form the capsule or shell of the particle structure.

Referring again to FIGS. 1 and 2, the buffer layer 18 may be designed to minimize the mechanical swelling of the core 16. In various embodiments, the buffer layer 18 acts as a buffer that allows for core expansion, and thus, minimizes the possibility of fracture of the core 16. In addition, the structure of the capsule 12 may be designed to tolerate further core particle swelling therein. Thus, the capsule 12 may be designed to further minimize capacity loss. The capsule 12 provides a mechanically robust design that is capable of expanding and contracting in concert with the swelling of the modified core particles therein. This swelling tolerance of the capsule 12 helps preserve the capacity and minimize capacity loss of the resulting electrode and electrochemical cell.

In various embodiments, the capsule 12 which encases the active material particles 14, increases the electrical conductivity between the capsule 12 and core 16 as a result of the increased contact of the active material particles 14 with an interior surface of the capsule 12. In addition, the capsule 12 further enhances the electrical conductivity between the core particles 16, a current collector, a supporting substrate, and the surrounding area of the particles.

In various embodiments, the electrode of the present application may be constructed from an electrode slurry that comprises an anode material of the present application, a binder, a conductive additive, and a solvent. Appropriate proportions of the components of the anode material and other constituents are first mixed to form the electrode slurry. Once fabricated, the electrode slurry is applied to a surface of an electrode current collector (not shown), composed of an electrically conductive material, such as copper, to create an electrode for use in an electrochemical cell. After the electrode slurry has been applied to the surface of a substrate, such as a current collector (not shown), the electrode slurry is dried and calendared to compress the electrode to a desired porosity.

A dispersant (including surfactants, emulsifiers, and wetting aids), a thickening agent (including clays), defoamers and antifoamers, biocides, additional fillers, flow enhancers, stabilizers, cross-linking and curing agents may be added to the slurry mixture to ensure a homogenous mixture thereof. Examples of dispersants include, but are not limited to, glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5, 8-diol ethoxylate and others sold by Air Products under the trade names Surfynol® and Dynol®), salts of carboxylic acids (including alkali metal and ammonium salts), and polysiloxanes. Additional examples of dispersants may include sodium dodecanoate, alkanolamide, lanolin, polyvinylpyrrolidone, sodium alkyl sulfate, sodium alkyl sulfonate, lecithin, polyacrylate, sodium silicate, and polyethoxy, nitrocellulose and Triton® X-100 a dispersant having the chemical formula, $(C_2H_4O)nC_{14}H_{22}O$ produced by DOW Chemical company of Midland Mich. Examples of thickening agents include long-chain carboxylate salts (such aluminum, calcium, zinc, salts of stearates, oleates, palmitates), aluminosilicates (such as those sold under the Minex® name by Unimin Specialty Minerals and Aerosil® 9200 by Evonik Degussa), fumed silica, natural and synthetic zeolites. In various embodiments, the slurry mixture may comprise from about 0.01 to about 1.0 weight percent dispersant and/or thickening agent.

In various embodiments, binders may include but are not limited to, a fluoro-resin powder such as polytetrafluoroethylene (PTFE), polyvinylidene fluoride (PVDF), poly (acrylic) acid, polyethylenetetrafluoroethylene (ETFE), polyamides, and polyimides, and mixtures thereof. Additional binders may include, but are not limited to, polyethylene (UHMW), styrene-butadiene rubber, cellulose, polyacrylate rubber, and copolymers of acrylic acid or acrylate esters with polyhydrocarbons such as polyethylene or polypropylene, and mixtures thereof. Solvents may include but are not limited to, deionized water, ethanol, isopropyl alcohol, ethylene glycol, ethyl acetate, polar protiac solvents, polar aprotic solvents, N-methyl-2-pyrrolidone, and combinations thereof.

Conductive additives may include but are not limited to, carbon black, an electrically conductive polymer, graphite, or a metallic powder such as powdered nickel, aluminum, titanium and stainless steel.

In various embodiments, the electrode active slurry of the present application may comprise from about 50 to about 85 weight percent of the electrochemically active material 10, from about 10 to about 25 weight percent binder, from about 2 to about 7 weight percent the conductive additive and the remainder comprising the solvent or solvent solution. In various embodiments, the electrode active slurry may have a solids content that ranges from about 15 to about 35 weight percent. In various embodiments, the slurry may have a solids content that ranges from about 20 weight percent to about 30 weight percent. The solids content of the slurry allows for an ideal slurry viscosity that enhances a uniform coating on a substrate or current collector.

Each of the constituents of the electrode may be added separately, or alternatively, as separate electrode suspensions comprising at least portions of the electrode active slurry component materials that are combined to create the electrode slurry of the present application. In various embodiments, the components of the electrode active slurry are mixed to a uniform consistency. The slurry components may be mixed using a variety of unlimited techniques such as ball milling or planetary mixing.

In various embodiments, mixing times may range from about 30 minutes to 2 hours depending on batch size to achieve a uniform, homogenous slurry mixture. Milling media may also be added to the slurry to aid in creating a homogenous mixture. The electrode slurry may be further dispersed through manual or automated agitation. Such agitation may include physical shaking or rocking of the suspension. In addition, the electrode slurry may be subjected to ultrasonication for about 30 seconds to about 30 minutes to further disperse the silicon and carbon particles and help to create a homogeneous electrode suspension mixture. The electrode slurry should be prepared such that it is able to adequately flow and adhere onto the surface of the substrate. In various embodiments, the electrode slurry may have a viscosity ranging from about 0.1 Pa·S to about 1,000 Pa·S at a shear rate of between about 0.1 to 1,000 $s^{-1}$.

After the electrode slurry has been formulated, the slurry is applied to the surface of a substrate. In various embodiments, the electrode slurry may be applied to the surface of a substrate comprising a metal, a polymer, a ceramic, and combinations thereof. Non-limiting examples of substrate materials may include but are not limited to, metals such as copper, aluminum, nickel, and their alloys, polymers such as polyethylene, polyimide, and polyether ether ketone (PEEK), as well as alumina and various glasses. In various embodiments, the electrode slurry is applied to the surface of a current collector such as those composed of copper, nickel, aluminum, and combinations thereof.

In various embodiments, the electrode slurry may be applied to a desired thickness ranging from a few nanometers to a few micrometers using a variety of non-limiting application techniques. In various embodiments, the thickness of the applied electrode slurry may range from about 5 µm to about 50 µm. These application techniques may include but are not limited to, the use of Meyer rod coating, the use of a doctor blade or knife, spray coating, dip coating, spin coating or brush application. In addition, the electrode slurry layer may be applied to a substrate surface through the use of thick-film or thin-film processing techniques.

Furthermore, in various embodiments, the surface of the substrate may be modified prior to the application of the electrode slurry to improve adhesion to the substrate surface. Examples of such substrate surface modifications include, but are not limited to, surface etching or surface roughening through the use corona treatment, acid etching, sand blasting or bead blasting.

After the electrode slurry has been applied to the surface of the substrate, it is then dried to remove at least a majority of the solvent. In various embodiments, the electrode slurry layer may be dried using convection air drying, a UV light source and/or an infrared light source. Additionally, the electrode slurry may be dried through the use of freeze drying, vacuum drying, or through osmosis.

In addition, the slurry may be dried through application of a heat source that is applied directly to the exposed surface of the electrode slurry coating or alternatively, the electrode slurry may also be dried through application of a heat source to the underlying substrate, or both. Furthermore, the electrode slurry may be dried in a variety of non-limiting atmosphere conditions having a variety of atmospheric pressures. For example, a gas such as nitrogen may be used to control the drying process. In various embodiments, the applied electrode slurry is dried under a UV-light source for about 1 hour afterward it is then dried in an oven at about 80° C. for between about 2 to 24 hours, or until the solvent has been substantially removed from the resulting electrode structure.

In various embodiments, the electrode slurry is dried to a thickness ranging from about 5 µm to about 50 µm. In various embodiments, the electrode slurry is dried to a thickness ranging from about 8 µm to about 15 µm. In various embodiments, the thickness of the dried electrode layer(s) is targeted to achieve an increase in electrical power. The reduced electrode thickness minimizes the diffusion distance and which enables rapid lithium ion migration within the electrode structure.

The drying process of the present application allows for the electrochemically active material 10, to maintain the internal void space 20 within the capsule particle structure. Subjecting the dried electrode to further elevated heating conditions, such as sintering, may lead to a decrease in electrical conductivity of the material and, in addition, may cause the silicon or silicon oxide within the particle of the electrochemically active material 10 of the present application to become fused to the graphene or graphene oxide capsule 12. As a result, the capacity generated by the particles may decrease.

After the slurry is dried, the formed electrode may be calendered. In various embodiments, the calendaring process compresses the electrode thus decreasing the void space within the dried electrode. In various embodiments, the dried electrode may be calendered to achieve a target void space and internal porosity that provides for increased lithium diffusion, in addition to structural integrity. In various embodiments, the calendaring process may utilize a roller, or another such tool, that is rolled over the dried electrode to ensure a proper internal porosity. In various embodiments, the calendaring process may range from about 30 seconds to about 5 minutes depending upon the thickness of the electrode and the desired internal porosity. In various embodiments, the electrode internal porosity may range from about 40 percent to about 60 percent. In various embodiments, the internal porosity may be about 50 percent. Internal porosity is measured by the following equation:

$$\text{Porosity}(\%) = 1 - \left(\frac{\text{measured density}}{\text{theoretical density}}\right)$$

where the measured density is measured by dividing the mass of the dried electrode by its volume and the theoretical density is the density of the electrode active material that is 100 percent dense. The theoretical density is assumed to be 2.25 g/cubic centimeter. In various embodiments, constructing the electrode to a targeted optimal internal porosity provides additional channels within which lithium ions may diffuse while also providing the required structural integrity for long life in an electrochemical environment within the cell.

The increased internal porosity thus provides for an increased volume of lithium ions to diffuse through the electrode. In addition, increasing the internal porosity shortens the distance with which lithium ions travel through the electrode. As a result of the increased internal porosity, the charge/discharge rate capability of the electrode and resulting electrochemical cell increases.

The electrode thus comprises the composite anode material, and a non-active material comprising a carbon material, which may include amorphous carbon. In various embodiments, after the drying process, the anode material comprises the active material particles and the capsules at a weight ratio ranging from about 80:20 to about 6:40, such as about 70:30. The electrode may include from about 0.01 weight percent to about 5 weight percent of the non-active material.

After the electrode layer(s) are dried and calendered, the electrode layer(s) and current collector substrate subassembly may be cut to form an electrode of an appropriate shape for incorporation into an electrochemical cell. Alternatively, the electrode layer may be removed from the substrate to form a free-standing electrode. The term 'free standing' is defined herein as sufficiently isolated from its environment, in this case, sufficiently absent the substrate.

In various embodiments, the formulated electrode is an anode or negative electrode that is utilized within a secondary lithium-ion electrochemical cell. The electrochemical cell of the present application further comprises a cathode composed of an electrically conductive material that serves as the other, positive electrode of the cell. In various embodiments, the cathode is composed of solid materials and the electrochemical reaction at the cathode involves the conversion of lithium ions that migrate back and forth between the anode, i.e., a first electrode, and the cathode, i.e., a second electrode, into atomic or molecular forms.

During discharge of the cell, lithium ions flow from the anode or negative electrode to the cathode or positive electrode. To recharge such secondary cells, lithium ions from the cathode or positive electrode are intercalated into the anode by applying an externally generated electrical potential to the cell. The applied recharging potential serves to draw lithium ions from the cathode material, through the electrolyte, and into the anode. The solid cathode may comprise a cathode active material of a metal oxide, a lithiated metal oxide, a metal fluoride, a lithiated metal fluoride or combinations thereof as disclosed in U.S. patent application Ser. No. 14/745,747 to Hayner et al., which is assigned to the assignee of the present application and incorporated fully herein by reference. In various embodiments, the cathode active material comprises $LiNi_xCo_yAl_zO_2$, where x, y and z are greater than 0 and wherein x+y+z=1. Other cathode active materials may include but are not limited to lithium cobalt oxide ($LiCoO_2$), lithium iron phosphate ($LiFePO_4$) and lithium manganese oxide ($LiMn_2O_4$). Additional cathode active materials may also include, but are not limited to, $LiNi_xMn_yCo_zO_2$, where $0.3 \leq x \leq 1.0$, $0 \leq y \leq 0.45$, and $0 \leq z \leq 0.4$ with x+y+z=1. Furthermore, the cathode active material may comprise $Li_{1+x}Ni_\alpha Mn_\beta Co_\gamma O_2$, where x ranges from about 0.05 to about 0.25, α ranges from about 0.1 to about 0.4, β ranges from about 0.4 to about 0.65, and γ ranges from about 0.05 to about 0.3.

In a larger scope, the cathode active material may comprise sulfur (S), lithium sulfide ($Li_2S$), a metal fluoride, a lithium metal fluoride, a lithium metal phosphate, and a lithium metal silicate where the metal may comprise a transition metal from the Periodic Table of Elements, such as iron (Fe), manganese (Mn), cobalt (Co), nickel (Ni), copper (Cu), vanadium (V), chromium (Cr), non-transition metals such as bismuth (Bi), and combinations thereof. Specific examples of cathode active materials may include $MF_x$ where $0 \geq x \leq 3$, $Li_xMF_x$ where $0 \geq x \leq 3$, $LiMPO_4$, $Li_2MSiO_4$ composite layered-spinel structures such as $LiMn_2O_4$-LIMO where M is a transition metal from the Periodic Table of Elements, such as iron (Fe), manganese (Mn), cobalt (Co), nickel (Ni), copper (Cu), vanadium (V), chromium (Cr), a non-transition metal such as bismuth (Bi), and combinations thereof. Lithium rich positive electrode active materials of particular interest can also be represented approximately by the formula $Li_{1+x}Ni_aMn_bCo_cA_dO_{2-z}F_z$, where x ranges from about 0.01 to about 0.3, a ranges from about 0 to about 0.4, b ranges from about 0.2 to about 0.65, c ranges from 0 to about 0.46, d ranges from 0 to about 0.15 and Z ranges from 0 to about 0.2 with the proviso that both a and c are not zero, and where A is magnesium (Mg), strontium (Sr), barium (Ba), cadmium (Cd), zinc (Zn), aluminum (Al), gallium (Ga), boron (B), zirconium (Zr), titanium (Ti), calcium (Ca), selenium (Ce), yttrium (Y), niobium (Nb), chromium (Cr), iron (Fe), vanadium (V), lithium (Li) or combinations thereof. A person of ordinary skill in the art will recognize that additional ranges of parameter values within the explicit compositional ranges above contemplated and are within the present disclosure.

In various embodiments, the cathode active material is formed by the chemical addition, reaction, or otherwise intimate contact of various oxides, phosphates, sulfides and/or metal elements, for example, during thermal treatment, sol-gel formation, chemical vapor deposition, or hydrothermal synthesis in mixed states. The cathode active material thereby produced may contain metals, oxides, phosphates, and sulfides of Groups, IB, IIB, IIIB, IVB, VB, VIB, VIIB, VIII, and VIIA which includes the noble metals and/or other oxide and phosphate compounds. In various embodiments, a cathode active material is a reaction product of stoichiometric proportions of at least fully lithiated to non-lithiated, $LiNi_{0.8}CO_{0.15}Al_{0.05}O_2$.

An exemplary cell of the present application further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the present application is activated with a nonaqueous, ionically conductive electrolyte operatively associated with the anode and the cathode. The electrolyte serves as a medium for migration of lithium ions between the anode and the cathode during electrochemical reactions of the cell, particularly during discharge and re-charge of the cell. The electrolyte is comprised of an inorganic salt dissolved in a nonaqueous solvent. In various embodiments, the inorganic salt comprises an alkali metal salt dissolved in a mixture of low viscosity solvents including organic esters, ethers and dialkyl carbonates and high conductivity solvents including cyclic carbonates, cyclic esters, and cyclic amides.

Additional low viscosity solvents useful with the present application include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

In various embodiments, the electrolyte of the present application comprises an inorganic salt having the general formula $YAF_6$ wherein Y is an alkali metal similar to the alkali metal comprising the anode, and A is an element selected from the group consisting of phosphorous, arsenic and antimony. Examples of salts yielding $AF_6$ are: hexafluorophosphate ($PF_6$), hexafluoroarsenate ($AsF_6$) and hexafluoroantimonate ($SbF_6$). In addition, other salts may comprise lithium salts including $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6FSO_3$, $LiO_2CCF_3$, $LiSO_6F$, $LiB(C_6H_5)_4$, $LiCF_3SO_3$, and mixtures thereof. In various embodiments, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. In various embodiments, the alkali metal salt of the electrolyte comprises either lithium hexafluoroarsenate or lithium hexafluorophosphate dissolved in a 50/50 solvent mixture (by volume) of EC/DMC. In various embodiments, the electrolyte is 0.8M to 1.5M $LiAsF_6$ or $LiPF_6$ dissolved in a 50:50 mixture, by volume, of dimethyl carbonate and ethylene carbonate.

In various embodiments, the form of the electrochemical cell is a lithium ion cell wherein the anode/cathode couple is inserted into a conductive metal casing. In various embodiments, the casing may comprise stainless steel, although titanium, mild steel, nickel, nickel-plated mild steel, and aluminum are also suitable. The casing may comprise a metallic lid having a sufficient number of openings to accommodate a glass-to-metal seal/terminal pin feedthrough for the cathode and anode. An additional opening may be provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the present application can also be constructed in a case-positive design.

In various embodiments, the glass-to-metal seal comprises a corrosion resistant glass having from between about 0% to about 50% by weight silica such as CABAL 12, TA 23 or FUSITE MSG-12, FUSITE A-485, FUSITE 425 or FUSITE 435. In various embodiments, the positive terminal pin feedthrough comprises titanium although molybdenum and aluminum can also be used. The cell header comprises elements having compatibility with the other components of the electrochemical cell and is resistant to corrosion. The cell is thereafter filled with the electrolyte described hereinabove and hermetically sealed such as by close-welding a stainless steel ball over the fill hole, but not limited thereto. When the ionically conductive electrolyte becomes operatively associated with the anode and the cathode of the cell, an electrical potential difference is developed between terminals operatively connected to the anode and the cathode. During discharge, lithium ions migrate from the anode, i.e., the negative electrode to the cathode, i.e., the positive electrode. During recharge, lithium ions migrate in the opposite direction from the cathode to the anode. In various embodiments, migration of the lithium ions between the anode and cathode occurs in atomic or molecular forms.

Sample lithium-ion cells were constructed with anodes fabricated using the material formulation and fabrication methods of the present application. A counter electrode of pure lithium was used to complete each of the test cells. Lithium ion test cells were constructed with an anode composed of a plurality of electrochemically active material particles wherein the electrochemically active material particles included silicon particles encapsulated in graphene and having a particle size that ranges from about 1 μm to about 10 μm. In various embodiments, the anode material comprises particles having a crumpled capsule structure composed of graphene, reduced graphene oxide, graphene oxide, or a combination thereof. The active material particles comprising a silicon core with a buffer layer of silicon oxide, lithium silicate, or a combination thereof is encapsulated within the graphene capsule.

In various embodiments, the graphene, partially reduced graphene oxide, or graphene oxide that forms the particle capsule is of a crumpled morphology. Particles of the active material particles comprising a silicon core 16 and a silicon oxide buffer layer were fabricated utilizing the first silicon particle fabrication process, as previously discussed. In addition, particles of the active material comprising a crystalline silicon core and a lithium silicate buffer layer were also fabricated utilizing the first and second silicon particle fabrication processes. In various embodiments, the buffer layer comprised either silicon oxide ($SiO_x$) where x<0.8, or a lithium silicate comprising $Li_2Si_2O_5$, $Li_2SiO_3$, $Li_4SiO_4$, or a combination thereof.

Three lithium-ion cells referred to as Test Group 1 were constructed with an anode comprising an anode material of the present application comprising a crumpled capsule of reduced graphene oxide with encapsulated active material particles having an average particle size of about 50 nm that were subjected to step one of the silicon modification process. Thus, the active material particles within the crumpled capsule had a core of silicon and a buffer layer of silicon oxide.

In addition, three lithium ion cells referred to as Test Group 2 were constructed with an anode comprising an anode material similar to that of Test Group 1, except that the active material particles had an average particle size of about 400 nm.

Furthermore, three lithium ion cells, referred to as Test Group 3 were constructed with an anode comprising an anode material of the present application comprising reduced graphene oxide encapsulated active material particles formed by the first and second active material particle modification processes (FIGS. 3A and 3B). Thus, the active material particles utilized in the Test Group 3 samples comprised a core of crystalline silicon and a buffer layer of lithium silicate. It is noted that the active material particles of the Test Group 3 samples had an average particle size of about 400 nm.

In addition, lithium ion control cells were constructed with an anode having an electrochemically active material comprising silicon particles encapsulated within crumpled graphene and having average particle sizes of about 50 nm and about 400 nm, respectively. In addition, the silicon particles encapsulated within the crumpled graphene of the electrochemically active material utilized in the control cells were not processed using either of the first or the second silicon processing steps. Three lithium-ion control cells, referred to as Control Group 1, were constructed comprising an anode having an electrochemically active material that comprised silicon with a 50 nm particle size. Three lithium-ion control cells, referred to as Control Group 2, were constructed comprising an anode with an electrode active material that comprised silicon with a 400 nm particle size. Table I, shown below, identifies the compositions of the silicon particles utilized in the respective anode active materials of the test and control group cells.

TABLE I

| Cell Group | Average Silicon Particle Size | Silicon Treatment | Silicon Buffer layer Composition |
|---|---|---|---|
| Test Group 1 | 50 nm | 1 | Silicon Oxide |
| Test Group 2 | 400 nm | 1 | Silicon Oxide |
| Test Group 3 | 400 nm | 1 and 2 | Lithium Silicate |

TABLE I-continued

| Cell Group | Average Silicon Particle Size | Silicon Treatment | Silicon Buffer layer Composition |
|---|---|---|---|
| Control Group 1 | 50 nm | N/A | N/A |
| Control Group 2 | 400 nm | N/A | N/A |

All test and control cells were subjected to a pulse discharge regimen to test the specific capacity of the respective cells. Each of the cells was tested at a 10 C discharge rate to a predetermined threshold voltage of about 1.5 V. The pulse discharge regimen included a series of alternating 5 second current pulse and 5 second rest periods until a nominal voltage of 1.5V was reached.

Figure 5:
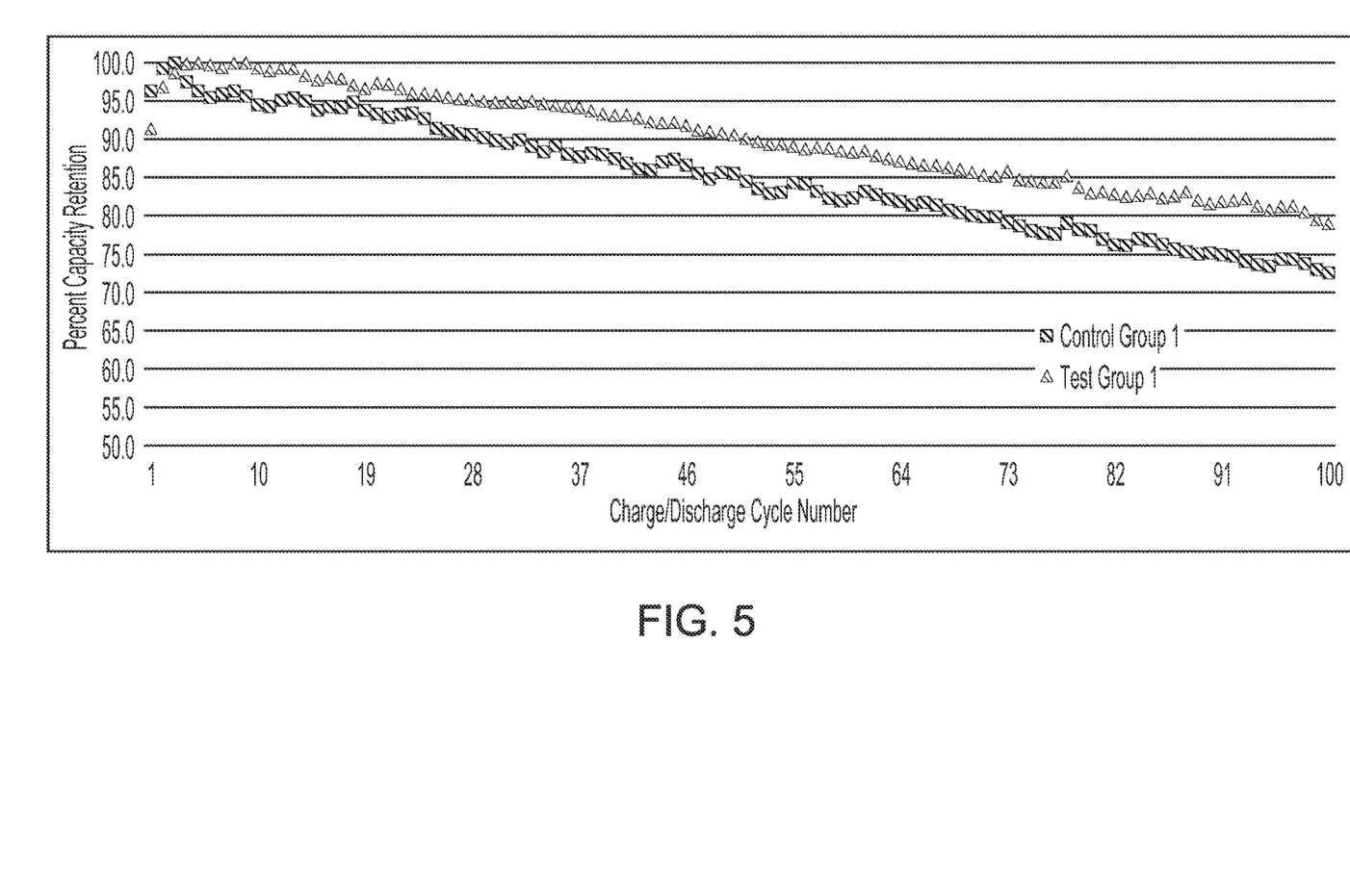
FIG. 5 is a graph that shows capacity retention percent as a function of charge/discharge cycle of lithium ion test cells having an electrode comprising the electrochemically active material of the present application in comparison to control cells constructed with electrodes comprising graphene encapsulated silicon particles.
Figure 6:
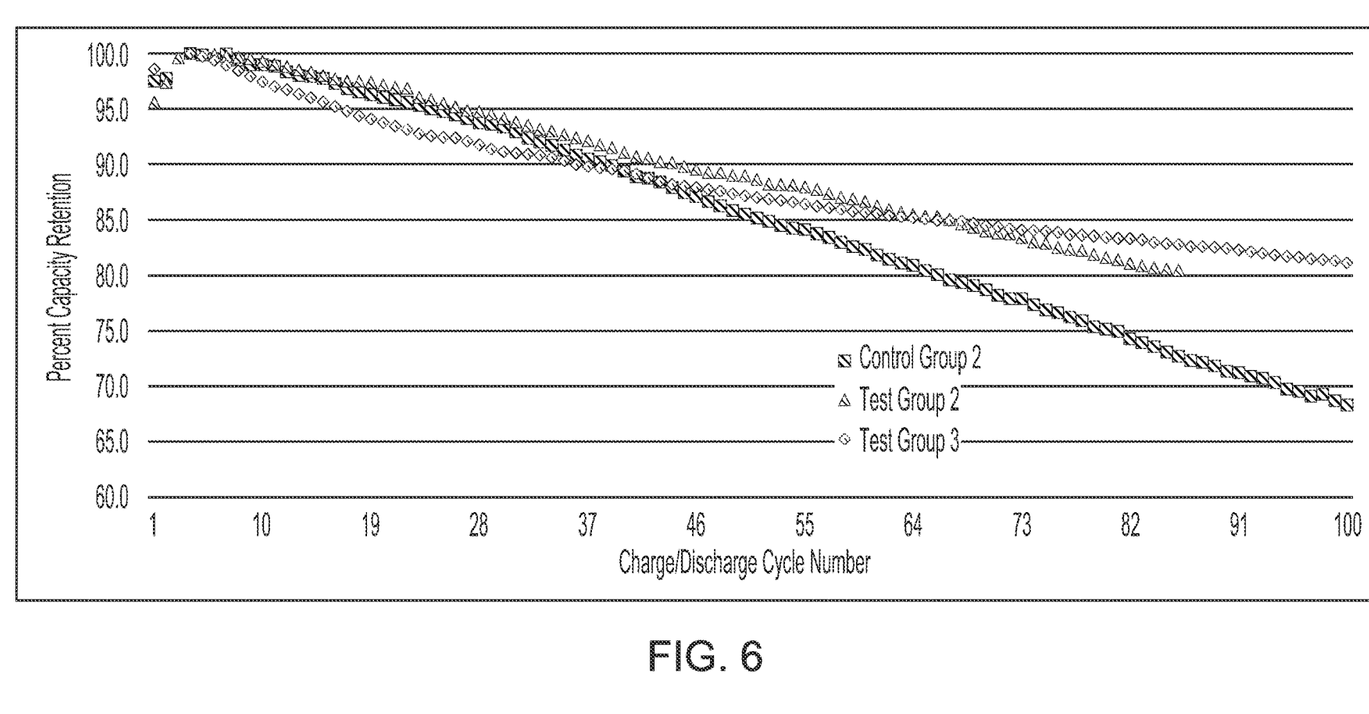
FIG. 6 is a graph that shows capacity retention percent as a function of charge/discharge cycle of lithium ion test cells constructed with an electrode comprising the electrochemically active material of the present application in comparison to control cells constructed with electrodes comprising graphene encapsulated silicon.

FIGS. 5 and 6 illustrate the results of the pulse discharge testing. As shown, the graphs show percent capacity retention as a function of the number of charge/discharge cycles. FIG. 5 illustrates the pulse discharge testing results for the Test Group 1 cells in comparison to the Control Group 1 cells. As shown, the Test Group 1 cells exhibited a greater capacity retention in comparison to the Control Group 1 cells. Specifically, as shown, the Test Group 1 cells exhibited a capacity retention percentage of about 77 percent after 100 charge/discharge cycles whereas the Control Group 1 cells exhibited a capacity retention percentage of about 72 percent after 100 charge/discharge cycles. These test results appear to indicate that the buffer layer comprising silicon oxide enhanced the capacity retention in comparison to lithium cells constructed with anodes composed of the anode material that did not comprise active material particles comprising a silicon core with a silicon oxide buffer layer.

FIG. 6 illustrates the pulse discharge testing results for the Test Group 2 cells in comparison to the Control Group 2 cells. As shown, the Test Group 2 cells exhibited a greater capacity retention in comparison to the Control Group 2 cells. As shown, after about 57 charge/discharge cycles, the Test Group 2 cells exhibited a capacity retention of about 88 percent whereas the Control group 2 cells exhibited a capacity retention of about 83 percent. In addition, FIG. 6 illustrates the pulse discharge testing results for the Test Group 3 cells in comparison to the Control Group 2 cells. As shown, the Test Group 3 cells exhibited greater capacity retention in comparison to the Control Group 2 cells. As shown, after about 95 charge-discharge cycles, the Test Group 3 cells exhibited a capacity retention of about 82 percent, whereas the Control Group 2 cells exhibited a capacity retention of about 70 percent. These test results appear to indicate that the anode material of the present invention that included active material particles having a silicon core with a buffer layer comprising lithium silicate enhances the capacity retention in comparison to lithium cells constructed with anodes comprising active material particles that do not include a buffer layer of lithium silicate.

TABLE II

| | No. of Cycles to 80% | Percent Improvement | Disconnection Parameter at 50 Cycles | Percent Improvement |
|---|---|---|---|---|
| Control Group 1 | 71 | — | 0.141 | — |
| Test Group 1 | 99 | 39 | 0.103 | 27 |
| Control Group 2 | 67 | — | 0.151 | — |
| Test Group 2 | 95 | 42 | 0.116 | 23 |
| Test Group 3 | 110 | 54 | 0.136 | 10 |

Table II, shown above, further illustrates the improvements in capacity retention that were exhibited by the Test Group cells in comparison to the Control Group cells. As shown in Table II, the Test Group 1 cells exhibited a 39 percent improvement in capacity retention over the Control Group 1 cells. As illustrated in the Table above, the Test Group 1 cells reached an 80 percent capacity retention at the 99$^{th}$ charge/discharge cycle whereas the Control Group 1 cells reached an 80 percent capacity retention at charge/discharge cycle 71. In addition, the cells of Test Groups 2 and 3 also exhibited an increase in capacity retention in comparison to the Control Group 2 cells. Specifically, as shown in Table II, Test Group 2 cells exhibited a 42 percent increase in capacity retention in comparison to the Control Group 2 cells. Furthermore, the Test Group 3 cells exhibited an increase in capacity retention of about 54 percent as the Test Group 2 cells reached an 80 percent capacity retention at charge/discharge cycle 110 in comparison to cycle number 67 for the Control Group 2 cells.

These test results appear to indicate that incorporating active material particles comprising a crystalline silicon core and a buffer layer comprising silicon oxide, lithium silicate, and/or carbon, incorporated within a crumpled capsule comprising graphene significantly improves capacity retention. In particular, the Test Group 3 cells, which comprised an electrode composed of the electrochemically active material comprising particles of the active material component composed of a silicon core with an buffer layer of lithium silicate, exhibited an increased capacity retention in comparison to Test Group 2 cells. The Test Group 2 cells comprised an electrode composed of the electrochemically active material comprising active material particles comprising a silicon core with an buffer layer of silicon oxide. It is noted that the cells of Test Group 2 exhibited a greater improvement in capacity retention over the respective control group cells as compared to the Test Group 1 cells. These test results appear to indicate that utilizing silicon having a larger particle size as well as utilizing silicon particles having a buffer layer comprising lithium silicate increase capacity retention.

In addition to measuring capacity retention, a "disconnection parameter" value was also calculated from the test results. The disconnection parameter is a unitless value that measures the relative cumulative capacity loss from the electrical disconnection of the silicon within the material structure. Thus, the lower the value of the disconnection parameter indicates less capacity loss that results from an electrical disconnection of the silicon within the material network.

As shown in Table II, all test group cells exhibited a lower disconnect parameter value in comparison to the control group cells. This would appear to indicate that incorporating silicon particles having a buffer layer comprising at least one of silicon oxide and lithium silicate within the electrochemically active material utilized in an anode of lithium-ion cells exhibits a lower "disconnection parameter" value and thus results in less capacity loss. In addition, it is noted that Test Group 1 cells exhibited a lower disconnection parameter in comparison to Test Group 2 cells. This would indicate that in addition to utilizing silicon particles having a buffer layer of silicon oxide within the electrochemically active material, silicon particles having a smaller particle size, i.e., a particle size of about 50 nm, exhibits a lower disconnection parameter and thus results in less capacity loss.

Thus, the results of the pulse discharge regimen clearly show the significance of the electrochemically active material particle structure and the optimized structure of silicon particles therein. It is appreciated that various modifications to the inventive concepts described herein may be apparent to those of ordinary skill in the art without departing from the spirit and scope of the present application as defined by the appended claims.

What is claimed is:

1. A composite electrode material comprising:
   capsules, each capsule comprising one of graphene, reduced graphene oxide, graphene oxide, or a combination thereof; and
   at least one active material particle disposed inside of each capsule, the active material particle comprising:
   an electrochemically active core; and
   a buffer layer that surrounds the core and comprises a silicon oxide, a lithium silicate, or combination thereof;
   wherein the buffer layer comprises $Li_2Si_2O_5$, $Li_2SiO_3$, $Li_4SiO_4$, or combinations thereof.

2. The electrode material of claim 1, wherein the core comprises crystalline silicon.

3. The electrode material of claim 1, further comprising a carbon-based material.

4. The electrode material of claim 1, wherein the buffer layer comprises a matrix.

5. The electrode material of claim 1, wherein:
   the capsules have an average particle size that ranges from about 0.5 µm to about 10 µm; and
   the particles have an average particle size that ranges from about 30 nm to about 500 nm.

6. The electrode material of claim 1, wherein the buffer layer has an average thickness that ranges from about 1 nm to about 50 nm.

7. The electrode material of claim 1, wherein the buffer layer has an average thickness that ranges from about 5 nm to about 10 nm.

8. An electrode, comprising:
   capsules comprising graphene, reduced graphene oxide, graphene oxide, or a combination thereof;
   active material particles disposed inside of the capsules, the active material particles comprising silicon particles surrounded by a buffer layer comprising an oxide, a silicate, or a combination thereof; and
   a binder;
   wherein:
   the binder comprises polytetrafluoroethylene (PTFE), polyvinylidene fluoride (PVDF), poly(acrylic) acid, polyethylenetetrafluoroethylene (ETFE), polyamides, and polyimides, polyethylene (UHMW), styrene-butadiene rubber, cellulose, polyacrylate rubber, or a mixture thereof; and
   the electrode has an internal porosity that ranges from about 40 percent to about 60 percent, as measured by the equation:

$$\text{Internal Porosity}(\%) = 1 - \left(\frac{\text{measured density}}{\text{theoretical density}}\right)$$

where the measured density is calculated by dividing the mass of a dried electrode by its volume, and the theoretical density is the density of the electrochemically active material that is 100 percent dense.

9. The electrode of claim 8, wherein:
   the buffer layer comprises a silicon oxide, a lithium silicate, or a combination thereof.

10. An electrode, comprising:
capsules comprising graphene, reduced graphene oxide, graphene oxide, or a combination thereof;
active material particles disposed inside of the capsules, the active material particles comprising silicon particles surrounded by a buffer layer comprising an oxide, a silicate, or a combination thereof; and
a binder;
wherein:
the silicon comprises a crystalline silicon; and
the buffer layer comprises $Li_2Si_2O_5$, $Li_2SiO_3$, $Li_4SiO_4$, or combinations thereof.

11. The electrode of claim 10, further comprising a carbon-based material.

12. The electrode of claim 10, wherein the buffer layer comprises the $Li_2Si_2O_5$.

13. The electrode of claim 10, wherein the buffer layer comprises the $Li_2SiO_3$.

14. The electrode of claim 10, wherein the buffer layer comprises the $Li_4SiO_4$.

15. The electrode material of claim 1, wherein the buffer layer comprises the $Li_2Si_2O_5$.

16. The electrode material of claim 1, wherein the buffer layer comprises the $Li_2SiO_3$.

17. The electrode material of claim 1, wherein the buffer layer comprises the $Li_4SiO_4$.

* * * * *